Oct. 14, 1941.   F. L. MAIN   2,259,075
BRAKE MECHANISM
Filed March 8, 1937   2 Sheets-Sheet 1

INVENTOR
FRANK L. MAIN
BY
ATTORNEYS

Oct. 14, 1941.   F. L. MAIN   2,259,075
BRAKE MECHANISM
Filed March 8, 1937   2 Sheets-Sheet 2

INVENTOR
FRANK L. MAIN
BY
ATTORNEYS

Patented Oct. 14, 1941

2,259,075

UNITED STATES PATENT OFFICE 2,259,075

BRAKE MECHANISM

Frank L. Main, Birmingham, Mich., assignor to Kelsey-Hayes Wheel Company, Detroit, Mich., a corporation of Delaware Application March 8, 1937, Serial No. 129,726

11 Claims. (Cl. 188—79.5)

This invention relates generally to brake mechanisms and refers more particularly to brake mechanism of the type having an adjustment anchor device supported between adjacent ends of the friction means.

One of the principal objects of the present invention resides in the provision of an adjustment anchor device having a bracket secured to the backing plate and having means carried by the bracket for adjusting the adjacent ends of the friction means in the form of a wedge loosely mounted in the bracket for movement circumferentially of the brake drum. With this construction, torque is transferred through the adjustment device from the leading portion of the friction means to the trailing portion of the latter, and advantage is taken of the torque action resulting from movement of the leading portion of the friction means into engagement with the brake flange.

Another advantageous feature of the present invention resides in the provision of a construction of the type set forth, wherein the friction means is accurately centralized in the drum when the brake is released by engagement of the side of the wedge adjacent the leading portion of the friction means with the corresponding side of the bracket, and wherein provision is made for effectively returning the shoes to this center position when the brake is released.

Another object of this invention consists in the provision of a brake construction wherein the torque transferred from the leading portion of the friction means to the trailing portion thereof is controlled by the internal friction in the adjustment device.

Still another advantageous feature of the present invention resides in the provision of an adjustment anchor device permitting radial movement of the adjustment ends of the shoes relative to the bracket of the anchor device. In accordance with one embodiment of the present invention, an operative connection between the wedge and adjacent ends of the friction means is provided which is capable of radial movement relative to the bracket, as well as the circumferential movement referred to above. This radial movement is advantageous in that it not only compensates for variations in the manufacture of the brake mechanism and for the expansion of the drum caused by the application of heat but, in addition compensates for deformation of the drum effected by pressure.

A further object of this invention consists in the provision of an adjustment anchor device having a floating wedge and having a bracket mounted on the brake carrier for rocking movement relative to the latter permitting radial movement of the adjustment ends of the friction means. With this construction the adjustment links operatively connecting the wedge to the ends of the friction means may either be loosely supported in the bracket, as set forth in the preceding paragraph, or may have a sliding fit in the bracket, depending to a great extent upon the resistance to torque transfer through the adjustment device desired.

In addition to the foregoing, the present invention contemplates a novel and extremely simple means for maintaining the friction means in proper axial relationship to the backing plate.

The foregoing, as well as other objects, will be made more apparent as this description proceeds, especially when considered in connection with the accompanying drawings, wherein.

Figure 3:
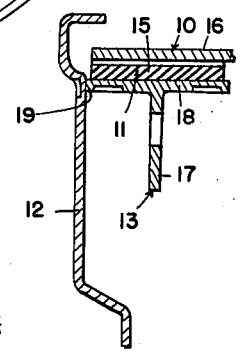
Figure 3 is a sectional view taken substantially on the plane indicated by the line 3—3 of Figure 1.

The brake mechanism shown in the drawings comprises a brake drum 10 and brake friction means 11 supported within the drum by a backing plate 12. In the present instance, the brake friction means comprises two shoes 13 and 14 having friction linings 15 secured thereto for engagement with the inner surface of the annular brake flange 16 on the drum. Upon reference to Figure 3, it will be noted that the shoes are substantially T-shaped in cross section having the web portions 17 extending inwardly in a plane substantially parallel to the plane of rotation of the drum and having the head portions 18 extending axially of the webs 17. The friction linings 15 are secured to the outer surfaces of the head portions 18 in the usual manner and the edges of the head portions 18 on opposite sides of the webs 17 are extruded at circumferentially spaced points to increase the width of the head portions at these points. The axially extending projections resulting from the extruding operation are designated in the drawings by the reference character 19 and the projections adjacent the backing plate 12 engage the inner surface of the latter to position the shoes with respect thereto. As pointed out above, the opposite side portions of the head 18 are extruded and this procedure is followed so that the shoes may be interchanged from one side of the drum to the other. Thus, it will be seen that a relatively simple and inexpensive rest for the shoes on the backing plate is provided without increasing the amount of material required in the head portion of the shoes and without subjecting the shoes to expensive grinding or machining operations. It will also be noted that with my improved rest construction, there is no tendency for the edges of the friction lining to contact with the backing plate and, as a consequence, friction is reduced to the minimum.

Figure 1:
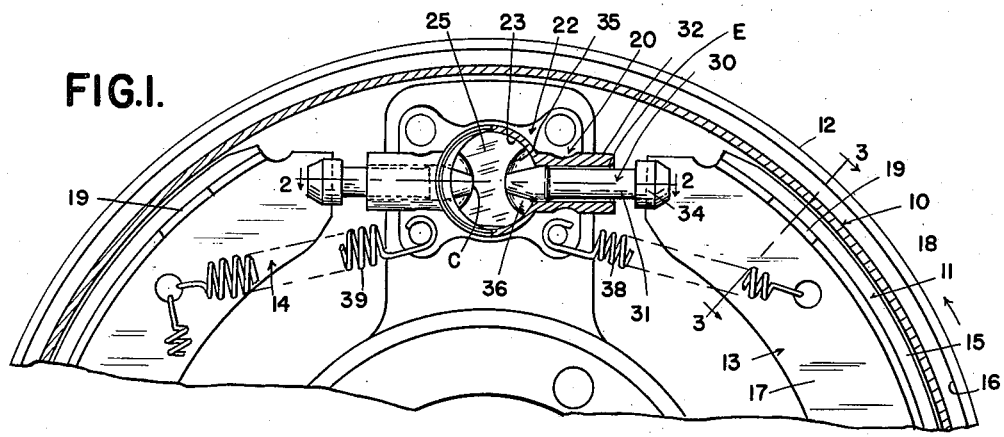
Figure 1 is an elevational view, partly in section, of brake mechanism constructed in accordance with this invention.

Assuming that the drum is rotating in the direction of the arrow in Figure 1, the shoe 13 is the leading or primary shoe and the shoe 14 is the secondary or trailing shoe. It will also be noted from Figure 1 that the opposite ends of the shoes are spaced from each other and that an adjustment anchor device 20 is supported on the backing plate between the upper ends of the shoes. A suitable actuating device 21 is supported on the backing plate 12 between the lower ends of the shoes and this device may be of any suitable construction. As will be presently described, however, both the adjustment and actuating devices permit circumferential movement of the shoes when the brake drum is rotating in the direction of the arrow in Figure 1, so that the servo action resulting from engagement of the primary shoe with the brake flange 12 is taken advantage of in applying the brake.

Figure 2:
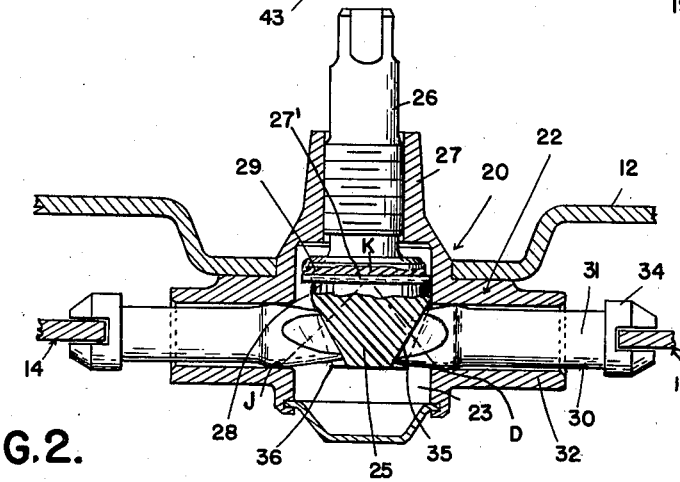
Figure 2 is a cross sectional view taken substantially on the plane indicated by the line 2—2 of Figure 1.

The adjustment anchor device is shown in detail in Figure 2 as comprising a bracket 22 secured to the backing plate and having a portion at the inner side of the backing plate provided with an axially inwardly extending bore 23. A wedge 25 is mounted in the bore 23 for movement axially of the latter and this wedge is adjusted by means of a screw 26 threaded in a reduced portion 27 of the bracket which extends through the backing plate 12.

The wedge 25 is generally elliptical in cross section with the opposite walls of substantially the same radius and with one side eccentric to the other. As shown in Figure 1, the side of the wedge engaged by the primary shoe 13 is substantially concentric to the bore 23 and the opposite side of the wedge is eccentric to the bore 23. The construction is such as to provide for the circumferential movement of the wedge relative to the bracket required to transfer torque from the leading shoe 13 to the trailing shoe 14 when the brake is applied. In the present instance, the outer end of the wedge is provided with a projection 27' extending in the general direction of shifting movement of the wedge and successively engageable in a series of circumferentially spaced recesses 28 on the inner surface of the enlarged head 29 at the inner end of the screw 26. The arrangement is such as to prevent accidental rotation of the adjustment screw 26 and to indicate predetermined increments of adjustment.

In the present instance, the adjustment wedge is operatively connected to the adjacent ends of the shoes by means of links 30 having stem portions 31 extending through tubular guides 32 formed on the bracket at diametrically opposite sides of the bore 23. The outer ends of the stem portions 31 of the links 30 are provided with enlarged heads 34 which are slotted to receive the adjacent ends of the web portions 17 of the shoes. The inner ends of the links 31 are inclined from the inner sides of the links to the outer sides of the latter and engage the correspondingly inclined bottom surfaces 35 of the grooves 36 in opposite sides of the wedge 25. The bottom surface of the groove 36 adjacent the adjustment end of the primary shoe 13 is preferably inclined to a greater extent than the bottom surface of the groove on the opposite side of the wedge. The purpose of this asymmetrical construction is to provide for moving the primary shoe at a greater rate than the secondary shoe and thereby compensate for the increased wear of the friction lining on the primary shoe.

With the above construction, it will be noted that axial inward movement of the wedge 25 by the screw 26 effects a radial outward movement of the adjustment ends of the shoes relative to the brake flange 12 to vary the clearance between the inner surface of the latter and the friction linings 15 on the shoes. In accordance with the present invention, proper adjustment of the brake shoes is effected by moving the wedge inwardly through the medium of the adjusting screw 26 to such an extent that the friction linings 15 engage the brake surface 12. After this is completed, the adjustment screw 26 is rotated in the opposite direction the extent required to secure the desired clearance between the friction linings 15 on the shoes and the adjacent surface of the brake flange. The extent of adjustment is indicated by the successive engagement of the projection 27' in the recesses 28 and may be accurately predetermined. In this connection, it will be noted that the shoe retraction springs 38 and 39 react through the adjustment links 30 to cause the wedge 25 to follow the adjustment screw 26 when the latter is moved outwardly.

Upon reference to Figure 1, it will be noted that the outer ends of the retraction springs are suitably connected to the adjustment ends of the shoes and the inner ends of these springs are anchored on the backing plate. The tension of the spring 39 is greater than that of the spring 38, with the result that the released position of the shoes is positively determined by engagement of the side of the wedge 25 adjacent the primary shoe 13, with the corresponding side of the bore 23 in the bracket 22. The construction is such that when the shoes are in this position, they are properly centered in the brake drum and sufficient clearance is provided between the leading side of the wedge 25 and adjacent surface of the bore 23 in the bracket 22 to permit the desired amount of torque to be transferred from the primary shoe 13 to the secondary shoe 14 when the actuator 21 is operated to move the primary shoe outwardly into engagement with the brake flange.

As pointed out above, the actuator 21 may be of any suitable construction, so long as it permits circumferential shifting movement of the shoes relative to the backing plate and, for the purpose of illustration, is shown in Figure 1 as comprising an outwardly movable wedge 40 supported on the backing plate between the lower ends of the shoes. The opposite edges of the wedge diverge inwardly from the outer end of the wedge and engage suitable rollers 41 carried by extensions 42 of the lower ends of the brake shoes. The adjacent ends of the extensions are recessed for abutting engagement with a shouldered pin 43 in the released position of the brake and are normally urged into engagement with this pin by means of retracting springs 44 and 45. The outer ends of the springs are suitably connected to the shoes adjacent the lower ends thereof, and the inner ends of the springs are anchored on the pin. The spring 44 is of greater strength than the spring 45 in order to insure engagement of the lower end of the primary shoe 13 with the brake flange upon outward movement of the wedge 40. The circumferential shifting movement of the two shoes referred to above is permitted by reason of the fact that the body portion of the wedge 40 is provided with an enlarged opening 46 for receiving the pin 43 and this opening is dimensioned to permit radial movement of the shoes, as well as circumferential movement.

In accordance with this invention, radial movement of the adjustment ends of the shoes is also permitted by reason of the fact that the diameter of the stem portions 31 of the adjustment links 30 is less than the internal diameter of the tubular portions 32. Also, the bottoms 35 of the grooves 36 in opposite sides of the wedge 25 and the adjacent ends of the links 30 are transversely curved to provide for rocking movement of the links in a plane substantially parallel to the plane of rotation of the brake drum. As a result, the links are capable of a limited angular movement in this plane and since the outer ends of the links are connected to the upper ends of the shoes, it follows that the latter ends are capable of radial movement relative to the brake drum. This radial movement not only offers the possibility of allowing a wider range of tolerances in manufacture but, in addition, compensates for drum expansion and any slight deformation of the drum caused by the application of pressure.

It has previously been stated that the transfer of torque through the adjustment device from the leading shoe to the secondary shoe is limited by the internal friction existing in the adjustment device. Referring to Figure 2 of the drawings, it will be noted that as the primary shoe 13 wraps into an engagement with the brake flange, the outer end of the link 30 connected to the primary shoe moves radially outwardly and in so doing frictionally engages the transversely curved surface C of the wedge, and also frictionally engages the bracket at the point D where the link swings in the bore of the tubular portion 32 on the bracket 22. In addition, when the pressure exerted on the wedge 25 by the primary shoe is sufficient to overcome the torque return spring 39, the wedge 25 slides toward the secondary shoe on the enlarged head 29 of the adjustment screw 26. The dot and dash line in Figure 2 shows the line of force which creates sliding friction at the points D and J on the two adjustment links and also at the surface K between the head 29 and wedge 25. Of course, this pressure is distributed along the area of the contacting surfaces aforesaid, and the unit pressure is not sufficiently great to create a cutting or biting action on the several parts of the adjustment device.

In actual practice, it has been found that the friction afforded by the relatively movable parts of the adjustment device controls the torque through the limited range to such an extent as to prevent grabbing or erratic action of the brakes. Inasmuch as the amount of servo depends to a great extent upon the internal friction in the adjustment device, this servo may be varied by changing the relative dimensions of the various parts of the adjustment device to provide more or less friction. For example, the friction may be reduced by shortening the tubular extensions 32 of the bracket so as to permit the adjustment links to swing throughout a greater arc relative to the bracket. By increasing the arc of swinging movement of the outer ends of the adjustment links, the primary shoe is permitted to follow the drum to a greater extent and more servo is acquired. Conversely, if the tubular portions 32 are lengthened, the arc of swinging movement of the outer ends of the links is reduced and the amount of friction is increased, since greater pressure is exerted at the points D and J by the adjustment links, as the adjustment end of the primary shoe moves outwardly toward the brake flange.

Figure 4:
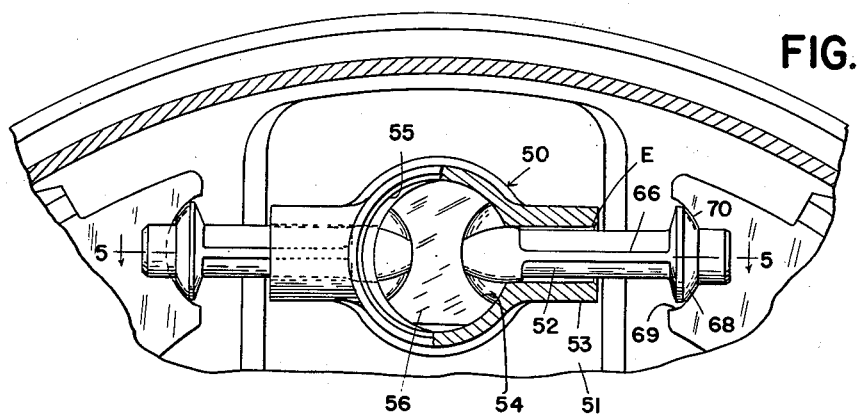
Figure 4 is a fragmentary elevational view of a slightly modified form of brake construction.
Figure 5:
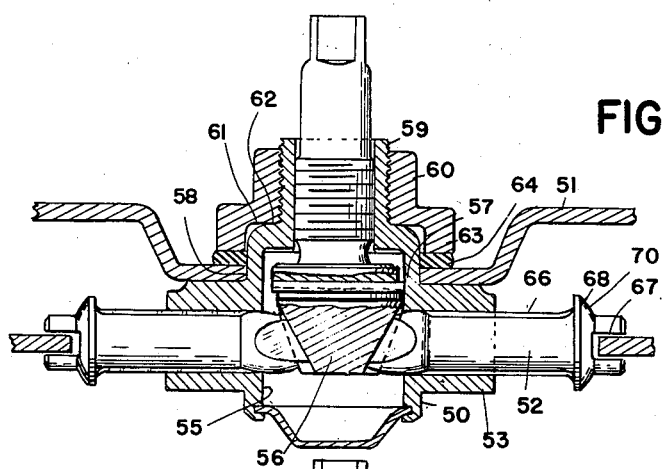
Figure 5 is a sectional view taken on the line 5—5 of Figure 4.

In the embodiment of the invention illustrated in Figures 4 and 5, a brake construction is shown wherein the internal friction through the adjustment device is substantially reduced to provide relatively free transfer of torque from the primary shoe to the secondary shoe. In this embodiment of the invention, the adjustment bracket 50 is mounted on the backing plate 51 for rocking movement relative to the plate and the adjustment links 52 are loosely mounted in the tubular extensions 53 of the bracket to provide swinging movement of the outer ends of the links radially of the brake drum. With this construction, it will be noted that as the adjustment end of the primary shoe is moved outwardly into engagement with the brake flange, the corresponding end of the primary adjustment link 52 is swung outwardly on the arcuate surface 54 of the wedge, and when this link reaches the limit of its angular movement in the bore of the tubular portion 53 of the bracket, the resulting pressure exerted on the bracket at E by the link functions to rock this bracket relative to the backing plate. This relieves the pressure of engagement of the link 52 with the bore of the tubular portion 53 and, as a consequence, reduces the friction to sliding movement of the link in the bracket. It follows from the above that the degree of swinging movement of the outer end of the primary link 52 depends upon the length of the associated guide portion 53 and the shorter that this guide portion is, the farther the outer end of the link swings before friction is created at the point E. As a consequence, the pedal pressure remains relatively light when emergency decelerations are made from high speeds. However, the construction is such that when the torque is sufficiently great, or when brake applications are so frequent as to approach the locking stage, the friction at the point E dampens the servo before the brake becomes uncontrollable and begins to grab.

In detail, the bracket 50 is provided with a portion at the inner side of the backing plate 51 having a bore 55 therein arranged with its axis extending parallel to the axis of the drum and positioned between the tubular extensions 53 for receiving the inner ends of the adjustment links 52. As in the first described form of the invention, a wedge 56 having an eccentric body portion, similar to the wedge 25, is supported in the bore 55 for movement axially of the latter and for movement transversely of the axis in the same manner as the wedge set forth in connection with the first described form of the invention. The opposite sides of the wedge 56 are grooved to receive the inner ends of the adjustment links and the transversely curved bottom surfaces 54 of the grooves diverge outwardly to effect an adjustment of the shoes upon axial inward movement of the wedge.

It has previously been stated that the bracekt is rockably mounted on the backing plate 51 and, in the present instance, this bracket rocks about the axis of the bore 55. As shown in Figure 5, the bracket has a cylindrical outer end portion 57 concentric with the axis of the bore and extending through a circular opening 58 in the backing plate. It will also be observed from Figure 5 that the cylindrical portion 57 terminates in a reduced outwardly extending portion 59 internally and externally threaded. The external threads removably receive a shouldered clamping nut 60 having a radially extending shoulder 61 adapted to abut a shoulder 62 surrounding the reduced portion 59 of the bracket and having an axially extending peripheral portion 63 surrounding the cylindrical outer end portion 57 of the bracket in a manner to cooperate with a spring lock washer 64 in clamping the bracket to the backing plate. The washer 64 may be in the form of a lock washer or may be of the flat type. In the event a lock washer is used, the pressure of the same is predetermined to afford the rocking movement of the bracket desired and, in the event a flat washer is used, the latter is of predetermined thickness so as to offer more or less resistance to rotation of the bracket.

The adjustment links 52 are loosely mounted in the tubular extensions 53 of the bracket so as to be capable of substantial rocking movement radially of the brake drum. In the present construction, displacement of the adjustment ends of the brake shoes axially of the drum is prevented by means of longitudinally extending ribs 66 on the front and rear sides of the links 52. It will, of course, be understood that if the rests 19 are provided on the brake shoes, the ribs 66 may be eliminated, since these rests will cooperate with the backing plate to maintain the shoes in proper relationship to the brake flange.

In the present embodiment, the outer ends of the adjustment links are connected to the adjacent ends of the shoes in such a manner as to permit rocking movement of the adjustment ends of the shoes relative to the links, but to prevent radial displacement of the adjustment ends of the shoes relative to the links. In this connection, it will be noted that the extreme outer ends of the links are slotted, as at 67, to receive the adjustment ends of the web portions of the shoes and the links are formed with enlargements 68 adjacent the outer ends thereof for abutting engagement with the edges of the web portions of the shoes. Upon reference to Figure 4, it will be noted that the enlargements extend into recesses 69 formed in the edges of the web portions of the shoes, and the outer surfaces 70 of the enlargements are spherical in contour for engagement with the correspondingly curved bottoms of the recesses 69. Thus, it will be seen that while the adjustment ends of the shoes may pivot relative to the links, they are prevented from radial displacement relative to the links and, as a consequence, the primary shoe will exert a direct thrust on the associated adjustment link in a direction circumferentially of the drum as soon as this shoe is engaged with the brake flange. In other words, any loss in servo caused by movement of the adjustment end of the primary shoe relative to its associated link is eliminated.

Figure 6:
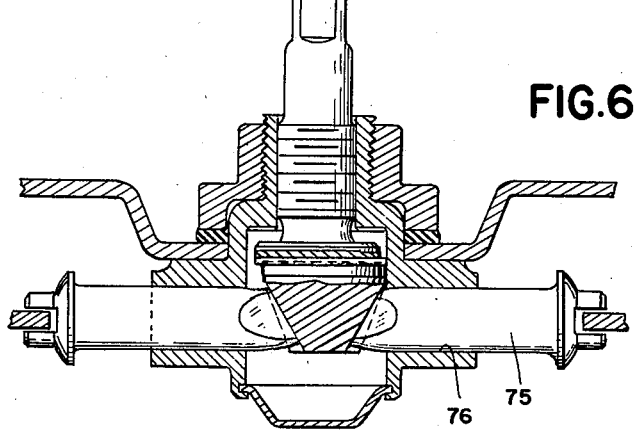
Figure 6 is a view similar to Figure 5 showing another modified form of brake construction.

In the embodiment of the invention illustrated in Figure 6, I have shown a construction of the type illustrated in Figures 4 and 5, with the exception that the adjustment links 75 are of a diameter approximating the internal diameter of the bore 76 so as to have a frictional engagement with the bore throughout the area of the bearing surface of the latter. This construction provides for increasing the resistance to the transfer of torque from the primary shoe to the secondary shoe and otherwise may be identical to the modification shown in Figures 4 and 5.

What I claim as my invention is:

1. In a brake mechanism, a brake drum, brake friction means supported within said drum for circumferential movement in one direction from the released position thereof, means for adjusting the brake friction means supported between the adjacent ends of said means, including an axially movable member supported for circumferential movement with the shoes in the aforesaid direction, a positive stop engageable with the adjustable member in the released position of the friction means to centralize the latter in the drum, retracting means for the end of the friction means adjacent the stop arranged to exert a force on the friction means tending to move the latter circumferentially in a direction to move the adjustable member away from the stop, and retracting means for the other end of the friction means effective to oppose the circumferential force component of the last named means with a force sufficiently greater to maintain the adjustable member into engagement with said stop in the released position of the friction means.

2. In a brake mechanism, a brake drum, brake friction means supported within the drum for movement radially of the drum and having spaced ends, an adjustment device for the friction means including a bracket supported between the ends of the friction means for rocking movement about an axis substantially parallel to the axis of the drum, a member supported on the bracket and adjustable relative to the bracket substantially along the axis of rocking movement of said bracket, and means carried by the bracket and operatively connecting said member to the ends of the friction means to adjust said ends upon movement of the member relative to the bracket.

3. In a brake mechanism, a brake drum, brake friction means supported within the drum for movement radially of the drum and having spaced ends, an adjustment device for the friction means including a bracket supported between the ends of the friction means for rocking movement about an axis substantially parallel to the axis of the drum and having a bore arranged with its axis on the axis of rocking movement of the bracket, a wedge slidably mounted in the bore and adjustable axially of the latter, and means carried by the bracket and operatively connecting opposite sides of the wedge to the adjacent ends of the friction means for adjusting the latter.

4. In a brake mechanism, a brake drum, brake friction means supported within the drum for movement radially of the drum and having spaced ends, an adjustment device for the friction means including a bracket supported between the ends of the friction means for rocking movement about an axis substantially parallel to the axis of the drum, a member supported on the bracket and adjustable relative to the bracket substantially along the axis of rocking movement of said bracket, and means mounted in the bracket for rocking movement radially of the drum relative to the bracket and operatively connecting said member to the ends of the friction means to adjust said ends upon movement of the member relative to the bracket.

5. In a brake mechanism, a brake drum, brake friction means supported within the drum for movement radially of the drum and having spaced ends, and an adjustment bracket mounted for rocking movement about an axis substantially parallel to the axis of the drum between the ends of the friction means, and a wedge member supported on the bracket for movement relative thereto and operatively connected to said ends for adjusting the latter.

6. In a brake mechanism, a brake drum, brake friction means supported within the drum for movement radially of the drum and having spaced ends, an adjustment device for the friction means including a bracket supported between the ends of the friction means for rocking movement, a member supported on the bracket and adjutable relative to the latter substantially along the axis of rocking movement of said bracket, and means operatively connecting said member to the ends aforesaid of the friction means including links supported by the bracket for rocking movement radially of the brake drum.

7. In a brake mechanism, a brake drum, brake friction means supported within the drum for movement radially of the drum and having spaced ends, an adjustment device for the friction means including a bracket supported between the ends of the friction means for rocking movement about an axis substantially parallel to the axis of the drum, said bracket having a bore on the axis of rocking movement and having tubular extensions projecting from opposite sides of the bore, a wedge mounted in the bore on the bracket for sliding movement longitudinally of said bore, and links supported in the tubular extensions for sliding movement relative to the bracket, said links having the inner ends engageable by the wedge and having the outer ends operatively connected to the ends aforesaid of the brake friction means.

8. In a brake mechanism, a brake drum, brake friction means supported within the drum for movement both circumferentially and radially of the drum and having spaced ends, an adjustment device for the friction means including a bracket supported between the ends of the friction means for rocking movement about an axis substantially parallel to the axis of the drum, a member movable between the ends of the friction means substantially along the axis of rocking movement of the bracket and supported on said bracket for movement circumferentially of the brake drum with the friction means, and means operatively connecting said member to the ends of the friction means for adjusting the latter upon movement of said member along the axis of rocking movement of the bracket.

9. In a brake mechanism, a brake drum, a backing plate for the brake drum, brake friction means supported within the drum on the backing plate for movement both radially and circumferentially of the drum and having spaced ends, an adjustment device for the friction means including a bracket supported between the ends of the friction means for rocking movement about an axis substantially parallel to the axis of the drum, a wedge movable between the ends of the friction means substantially along the axis of rocking movement of the bracket and supported on the bracket for movement relative thereto circumferentially of the brake drum, and links slidably mounted in the bracket for circumferential movement with the wedge and operatively connecting the latter to the ends of the friction means for adjusting said ends upon movement of the wedge along the axis of rocking movement of the bracket.

10. In a brake mechanism, a brake drum, brake friction means supported within the drum for movement radially and circumferentially of the drum and having spaced ends, an adjustment device for the friction means including a bracket supported between the ends of the friction means for rocking movement about an axis substantially parallel to the axis of the drum, said bracket having a bore on the axis of rocking movement thereof and having tubular extensions projecting laterally from the bore toward the ends of the friction means, a wedge mounted in the bore of the bracket for movement longitudinally of the bore and for movement transversely of the bore, and links slidably mounted in the tubular extensions for operatively connecting the wedge to the ends of the friction means.

11. Means for adjusting the shoes of brake mechanism, comprising a housing having a cylindrical chamber therein and sleeves extending from the sides of the chamber, studs connected with the shoes and slidably arranged in the sleeves and having their inner ends beveled, a wedge head movably arranged in the chamber and having recesses therein provided with sloping walls engaging the beveled ends of the studs, means for adjusting the head longitudinally in the chamber, said head being of general elliptical shape in cross section and having opposite arcuate sides of like radius and one eccentric to the other, the rear side being concentric to the cylindrical chamber and the other eccentric to the cylindrical chamber, the latter side being the forward side of the head, springs connecting the upper ends of the shoes to stationary parts of the brake mechanism, the forward spring which is connected with the forward shoe being of greater strength than the rear spring.

FRANK L. MAIN.